UNITED STATES PATENT OFFICE.

JOHN L. KELLOGG, OF BATTLE CREEK, MICHIGAN.

MANUFACTURE OF BEVERAGE EXTRACTS.

13,847. Specification of Reissued Letters Patent. Reissued Dec. 15, 1914.

No Drawing. Original No. 1,097,720, dated May 26, 1914, Serial No. 814,924. Application for reissue filed October 22, 1914. Serial No. 868,144.

*To all whom it may concern:*

Be it known that I, JOHN LEONARD KELLOGG, a citizen of the United States, residing in Battle Creek, in the county of Calhoun and State of Michigan, have invented a new and useful Improvement in the Manufacture of Beverage Extracts, of which the following is a specification.

My invention relates in general to the manufacture of beverage extracts, quickly soluble in water, from the starch bearing materials, such as wheat, corn, rye, barley and other cereals. These extracts are intended to be dissolved usually in hot water to be used as a healthful beverage in place of coffee and other beverages considered less healthful. Some years ago, I invented, manufactured and used, a quickly soluble extract for this purpose, which, in one instance, I made by heating and roasting a mixture containing wheat, bran and molasses until the sugar of the molasses was caramelized, then dissolving out of the roasted product the soluble constituents, evaporating the solution to dryness and reducing the whole to a comminuted condition, the solid soluble extract thus formed consisting of extractive matter in comminuted condition of a roasted cereal and a caramelized saccharine body. In my present invention I prefer to dispense entirely with the molasses, sugar, syrup or other saccharine body, which was essential to the said prior process and product, and rely instead on the addition of malt to the starch bearing material, the whole being so treated by heat and otherwise that the starch will be converted by the diastatic action of the malt into maltose and caramelization of the maltose will ensue. By dissolving out of the product the soluble contents, evaporating to dryness and reducing to granular or other comminuted form, an extract is produced which is quickly soluble in water, and when properly made makes a healthful beverage having the flavor and general characteristics of coffee.

In order that the nature and scope of my invention may be fully understood, I shall first describe in detail one mode in which I now prefer to carry out my invention, and then define in the claims the spirit of the invention and its scope.

In carrying out my invention, I first prepare a mixture of one-third ground barley malt and two-thirds corn flour, wheat flour, corn starch, or any other suitable starch material. I take the above mixture and mix it thoroughly with water until it is made into a thick paste. This paste is then placed in steam cooker or a jacket mixer and heated by means of steam to 160° to 180° F. and kept at this temperature for about two hours. By this step, the diastatic properties of the malt entirely convert the starch in the materials into maltose or malt sugar. I then place the mass in an inclosed rotary mixing cooker and cook it under about 40 pounds steam pressure for five hours. This serves to partially caramelize the malt sugar formed in the preceding step, and when the mass is drawn from the cooker it is of a dark brown coffee color and has a sweetish bitter flavor. The material is now drawn off from the mixing cooker and thoroughly mixed in an ordinary baker's bread mixer with bran, malt sprouts, and roasted pulverized rye. After mixing, the product is thoroughly dried in an ordinary steam rotary drier and it is then roasted in an ordinary coffee roaster until it has a rich brown coffee color. This serves to further caramelize the malt sugar. The material is now placed in a cooker and cooked for two hours until all the soluble matter has been extracted from the grain. The mass is then percolated and the soluble extract drawn off, the residue being washed several times until all the soluble extract has been obtained. The soluble extract is collected and evaporated down to a thick syrup by means of ordinary vacuum pans. This thick syrup is then pumped into a rotary vacuum drier and completely evaporated and the resulting material is ground into a granular powder. This granular powder is the final form of the product and the beverage prepared therefrom has the flavor and general characteristics of a good grade of coffee when it is properly made. I use this product to prepare a beverage for instant use by placing a teaspoonful in a cup, pouring over it hot water, thoroughly mixing and adding cream and sugar to suit the taste.

Having thus described one way in which my invention is carried into practice, I claim as my invention:

1. The process of making a soluble beverage extract which comprises heating a mixture containing starch bearing material and malt to convert the starch into maltose and caramelize the maltose, in dissolving out the soluble contents, in evaporating the solution and converting the evaporated extract into a dry comminuted condition.

2. The process of making a soluble beverage extract which comprises keeping a mixture containing starch bearing material and malt at a temperature of about 140° to 180° F., so as to convert the starch into maltose, roasting the whole until the maltose is caramelized, dissolving out the soluble contents, evaporating the solution, and converting the evaporated extract into a dry comminuted condition.

3. The process of making a soluble beverage extract which comprises heating a mixture of starch bearing material, bran and malt, so as to convert the starch into maltose, and caramelize the maltose, dissolving out the soluble contents, evaporating the solution, and converting the evaporated extract into a dry comminuted condition.

4. The process of making a soluble beverage extract which comprises heating a mixture containing starch bearing material and malt at a temperature of about 140° to 180° F. to convert the starch into maltose, then roasting the whole until the maltose is caramelized, then dissolving out the soluble contents, evaporating the solution, and converting the evaporated extract into a dry comminuted condition.

5. The process of preparing a powdered beverage extract which consists of preparing a mixture of one part barley malt, two parts of suitable starchy material, and sufficient water to form a thick paste, heating said paste at a temperature of approximately 170° F. until the starch therein is converted into maltose, cooking said material under approximately 40 pounds pressure for about five hours to partially caramelize the maltose therein, mixing the resulting material with bran, malt sprouts and roasted pulverized rye, drying and roasting the same to further caramelize the maltose, percolating the resulting mass, evaporating the soluble extract *in vacuo* and converting the resultant product into a granular powder.

6. The process of preparing a powdered beverage extract which consists of preparing a mixture of one part barley malt, two parts of suitable starchy material, and sufficient water to form a thick paste, heating said paste until the starch therein is converted into maltose, cooking said material under approximately 40 pounds pressure for about five hours to partially caramelize the maltose therein, mixing the resulting material with bran, malt sprouts, and roasted pulverized rye, drying and roasting the same to further caramelize the maltose, percolating the resulting mass, evaporating the soluble extract *in vacuo* and converting the resultant product into a granular powder.

7. The process of preparing a powdered beverage extract which consists of preparing a mixture of one part barley malt, two parts of suitable starchy material, and sufficient water to form a thick paste, heating said paste until the starch therein is converted into maltose, cooking said material to partially caramelize the maltose therein, mixing the resulting material with bran, malt sprouts and roasted pulverized rye, drying and roasting the same to further caramelize the maltose, percolating the resulting mass evaporating the soluble extract *in vacuo* and converting the resultant product into a granular powder.

8. The process of preparing a powdered beverage extract which consists of preparing a mixture of one part barley malt, two parts of suitable starchy material, and sufficient water to form a thick paste, heating said paste until the starch therein is converted into maltose, cooking said material to partially caramelize the maltose therein, mixing the resulting material with bran, malt sprouts and roasted pulverized rye, drying and roasting the same to further caramelize the maltose, percolating the resulting mass, and evaporating the soluble extract *in vacuo*.

9. The process of preparing a powdered beverage extract which consists of preparing a mixture of barley malt, suitable starchy material, and sufficient water to form a thick paste, heating said paste until the starch therein is converted into maltose, cooking said material to partially caramelize the maltose therein, mixing the resulting material with bran, malt sprouts and roasted pulverized rye, drying and roasting the same to further caramelize the maltose, percolating the resulting mass and evaporating the soluble extract *in vacuo*.

JOHN L. KELLOGG.

In the presence of—
CHAS. M. MARBLE,
C. H. HUGHES.